United States Patent

Rezac

[11] 4,015,727
[45] Apr. 5, 1977

[54] TRUCK UNLOADING DEVICE

[76] Inventor: Howard Dwight Rezac, 403 Spencer St., Gregory, S. Dak. 57533

[22] Filed: Aug. 6, 1975

[21] Appl. No.: 602,279

[52] U.S. Cl. .............................................. 214/82
[51] Int. Cl.² ......................................... B60P 1/00
[58] Field of Search ............... 214/82, 83.3, 83.24, 214/518

[56] References Cited

UNITED STATES PATENTS

| | | | |
|---|---|---|---|
| 2,803,357 | 8/1957 | Ronfeldt | 214/82 |
| 3,083,849 | 4/1963 | Mottin | 214/82 |
| 3,349,931 | 10/1967 | Wagner | 214/82 |
| 3,465,902 | 9/1969 | Colletti | 214/82 |
| 3,815,764 | 6/1974 | Gilfillan et al. | 214/82 |
| 3,865,260 | 2/1975 | Wieschel et al. | 214/82 |

Primary Examiner—Trygve M. Blix
Assistant Examiner—Charles E. Frankfort
Attorney, Agent, or Firm—Merchant, Gould, Smith, Edell, Welter & Schmidt

[57] ABSTRACT

A load bearing platform mounted in a vehicle box for reciprocatory rearward load discharging and forward return movement between the front and rear ends of the box, and a transverse load engaging wall structure mounted in the box above the platform for material unloading movement from the front end toward the rear end of the box. A pawl and ratchet connection between the platform and transverse wall structure imparts step-by-step load discharging movement to the transverse wall structure responsive to reciprocatory movement of the platform. Latch mechanism releasably holds the transverse wall structure at each step of its movement during forward return movements of the platform. A pair of side wall elements or wings project rearwardly from opposite ends of the transverse wall structure closely adjacent the side walls of the vehicle box to aid in reducing lateral pressure of the material against the side walls of the box during discharging movement of the platform and transverse wall structure.

6 Claims, 8 Drawing Figures

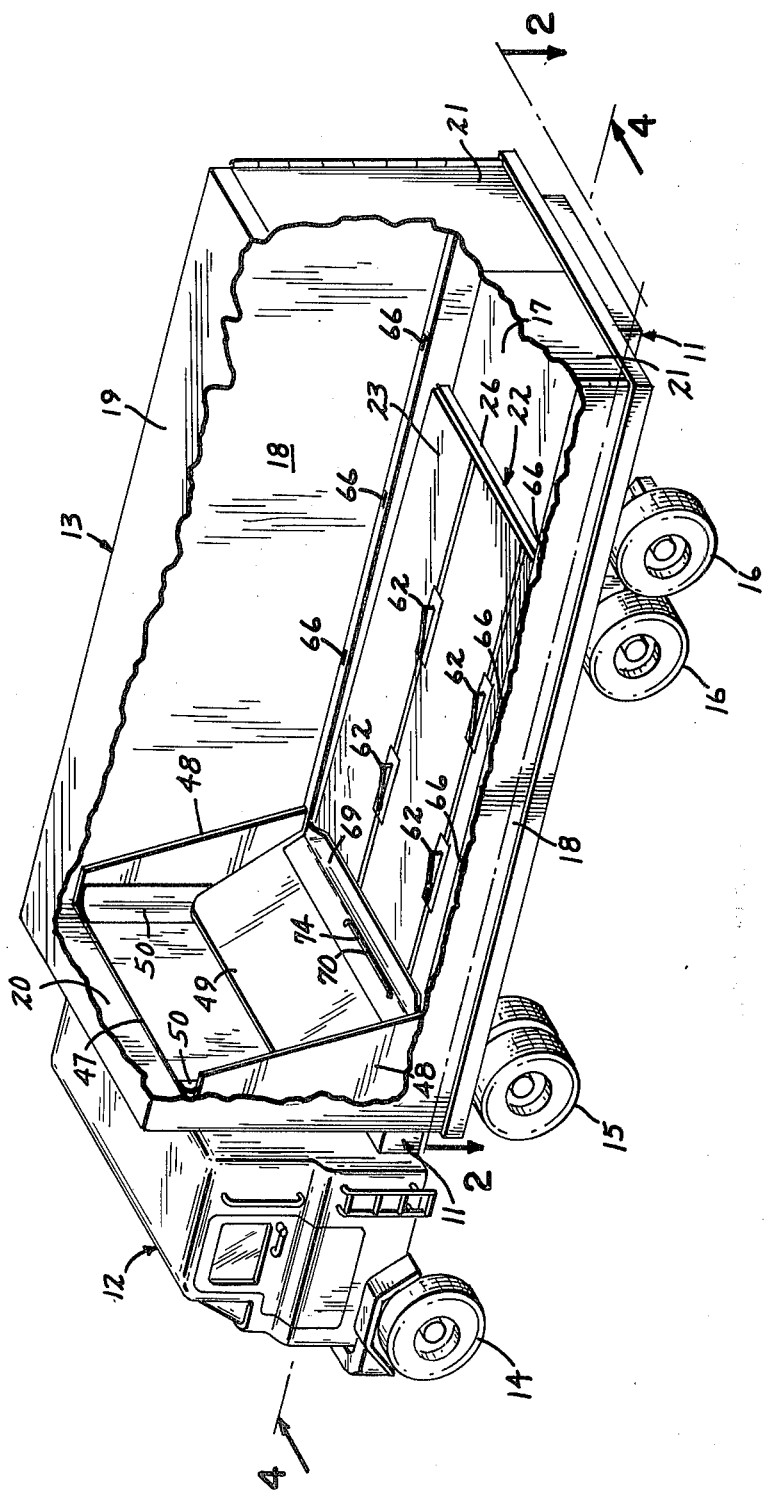

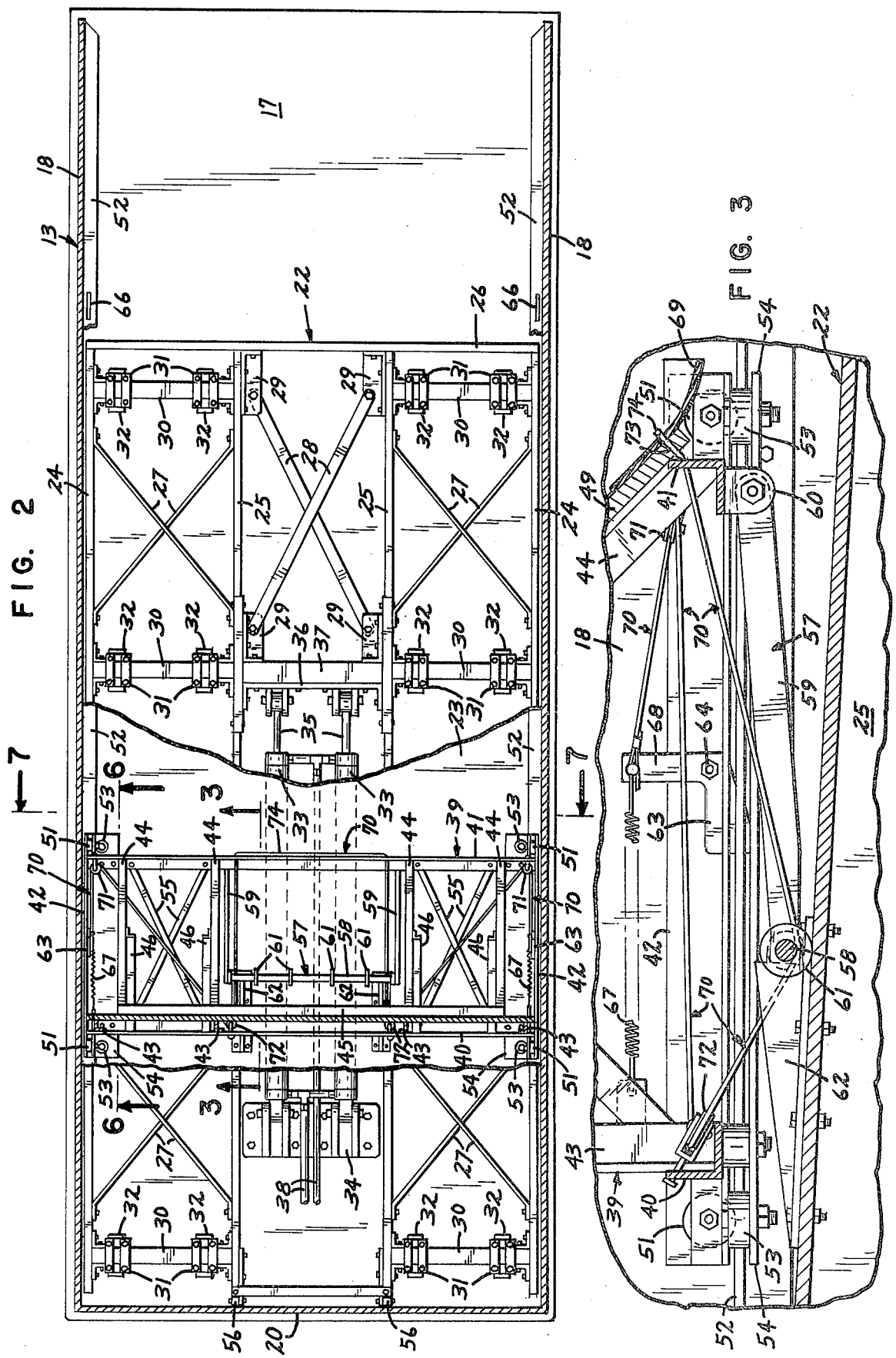

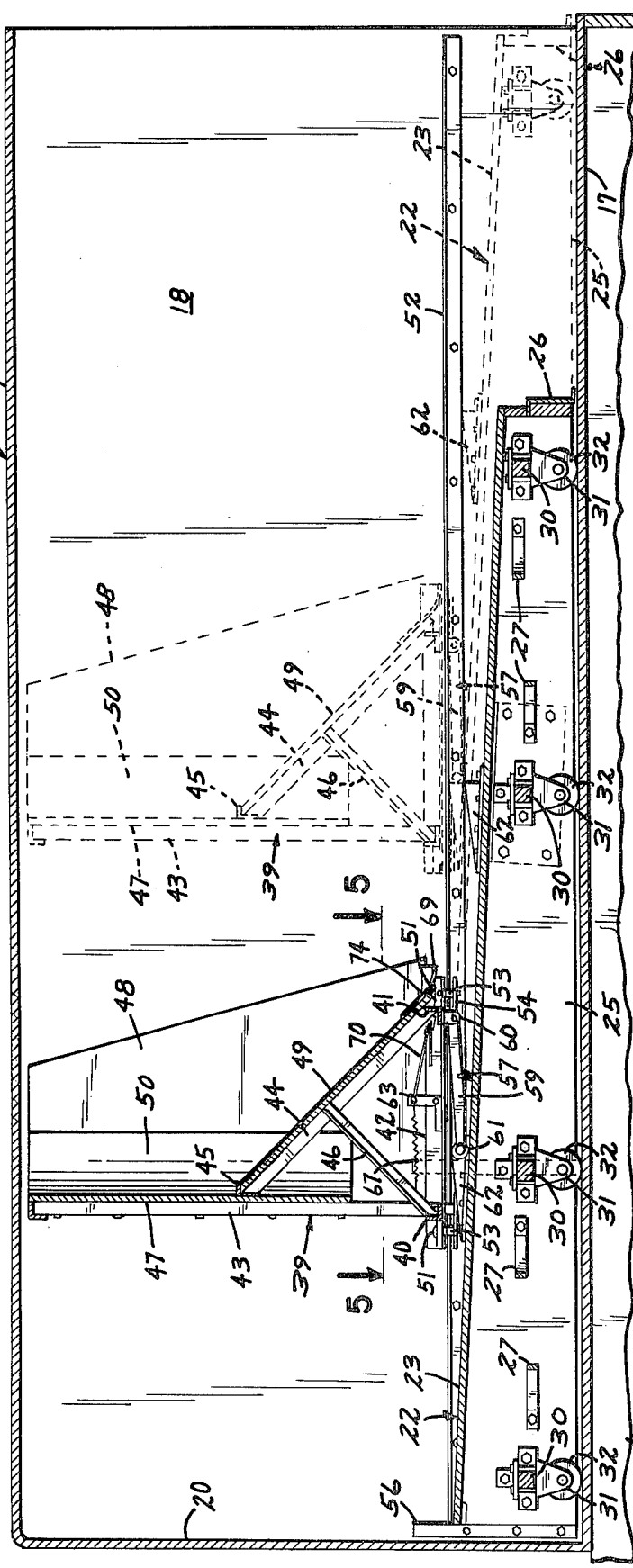
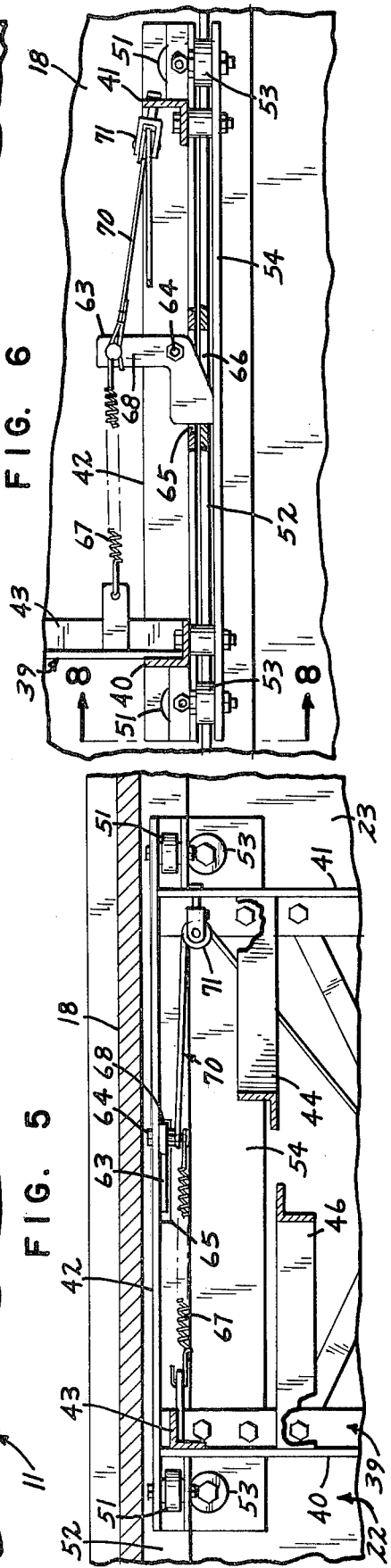

TRUCK UNLOADING DEVICE

This invention is in the nature of an improvement over vehicle box unloaders heretofore produced, and involves unloading mechanism which can be mounted in a vehicle box without substantial modification of the box and with the use of ordinary tools. The mechanism can be readily removed from the vehicle box when desired, leaving the box in condition for other uses.

SUMMARY OF THE INVENTION

The unloader mechanism of this invention, when mounted in a vehicle box having a floor or bottom wall, opposite side walls and a rear material discharge end, comprises a material supporting platform mounted on the floor for reciprocatory movements forwardly and rearwardly of the box, means for imparting reciprocatory movements to the platform, wall means including a transverse wall structure, and carriage means mounting the wall means above the platform for movements between the front and rear ends of the vehicle box. Inter-engaging elements on the platform and carriage means are operative to move the transverse wall structure in a rearward direction responsive to rearward material discharging movement of the platform. Releasable means is provided for holding the transverse wall structure against forward movement during forward return movement of the platform.

DESCRIPTION OF THE DRAWINGS

FIG. 1 is a view in perspective of a truck showing the loader of this invention mounted therein, some parts being broken away;

FIG. 2 is an enlarged view partly in plan and partly in horizontal section, taken on the line 2—2 of FIG. 1, some parts being broken away;

FIG. 3 is a further enlarged fragmentary section taken on the line 3—3 of FIG. 2;

FIG. 4 is an enlarged fragmentary vertical section taken generally on the line 4—4 of FIG. 1;

FIG. 5 is an enlarged fragmentary view partly in horizontal section and partly in plan, taken on the line 5—5 of FIG. 4;

FIG. 6 is an enlarged fragmentary section taken on the line 6x6 of FIG. 2;

DETAILED DESCRIPTION OF THE PREFERRED EMBODIMENT

Figure 7:
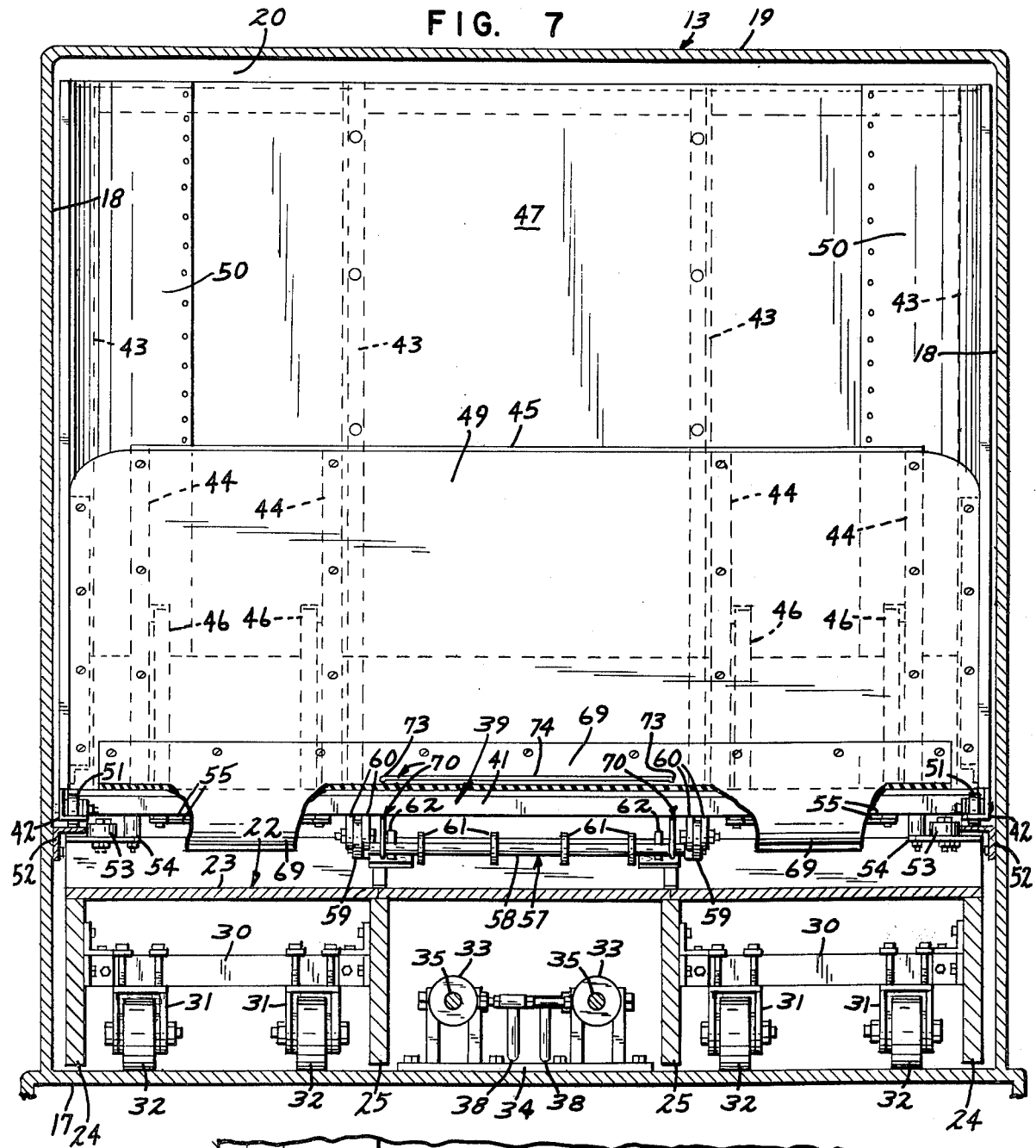
FIG. 7 is an enlarged transverse section taken on the line 7—7 of FIG. 2.

In FIG. 1, a conventional automotive vehicle in the nature of a truck and semi-trailer combination is shown as having an elongated articulated frame structure 11 on the front end of which is mounted a cab 12, and which, rearwardly of the cab, supports a generally rectangular box 13. The frame structure 11 is supported by steerable front wheels 14, intermediate drive wheels 15, and rear support wheels 16, in the usual manner. The vehicle box 13 comprises a flat bottom wall or floor 17, laterally spaced vertical walls 18, a roof 19, a front wall 20, and an open rear end that is normally closed by a pair of doors 21. The vehicle thus far is conventional in nature, and in and of itself, does not comprise the instant invention. Hence further detailed description thereof is omitted, in the interest of brevity.

An elongated generally rectangular platform 22 comprises a top wall 23, longitudinal side members 24, intermediate longitudinal members 25, a rear wall 26, and angle brace members 27 and 28. As shown particularly in FIG. 2, the brace members 27 are disposed between each longitudinal side member 24 and an adjacent one of the intermediate members 25, the angle brace members 28 being connected to brackets 29 secured to the intermediate longitudinal members 25. Cross beams 30 are rigidly secured between each side member 24 and its adjacent intermediate member 25, and have secured thereto bearing brackets 31 in which are journaled roller elements 32 that engage the floor 17 of the vehicle box and support the platform 22 for rolling movement within the box and longitudinally thereof. With reference particularly to FIGS. 1 and 4, it will be seen that the top wall 23 of the platform 22 slopes in a direction downwardly and rearwardly with respect to the vehicle box 13.

Means for imparting forward and rearward reciprocating movement to the platform 22 comprises a pair of fluid pressure operated cylinders 33 having closed ends pivotally secured to a mounting bracket 34 that is bolted or otherwise rigidly secured to the floor 17 of the vehicle box. The cylinders 33 extend longitudinally of the vehicle box 13 and are provided with piston equipped plunger rods 35 that are pivotally secured to a bracket 36 that is rigidly mounted to a cross beam 37 extending transversely between the intermediate longitudinal members 25, see particularly FIG. 2. The cylinders 33 are of the double acting variety, being supplied with fluid under pressure to their opposite ends alternately from a suitable source of supply, not shown, but through conduits 38, operation of the cylinders 33 being controlled by well known and commonly used control valves, not shown.

A generally rectangular carriage 39 comprises horizontally disposed front and rear transverse frame members 40 and 41, respectively, opposite end frame members 42 that extend longitudinally of the vehicle, a plurality of vertical legs 43 extending upwardly from the front member 40, support members 44 extending angularly upwardly from the rear member 41 to a cross frame 45 disposed in upwardly spaced parallel relation to the front frame member 40, and angular brace members 46. The legs 43 are disposed in spaced apart relationship longitudinally of the front transverse frame member 40 and support a transverse vertical wall section 47 which forms part of a transverse wall structure that further includes a pair of side wall elements 48 that extend rearwardly from opposite ends of the vertical wall section 47, and a rearwardly and downwardly sloping lower wall section 49 that is supported by the support members 44, and suitably secured thereto. As shown in FIG. 1, the wall section 47 and side wall elements 48 are connected by corner fillet elements 50 to provide a smooth rounded connection therebetween.

Figure 8:
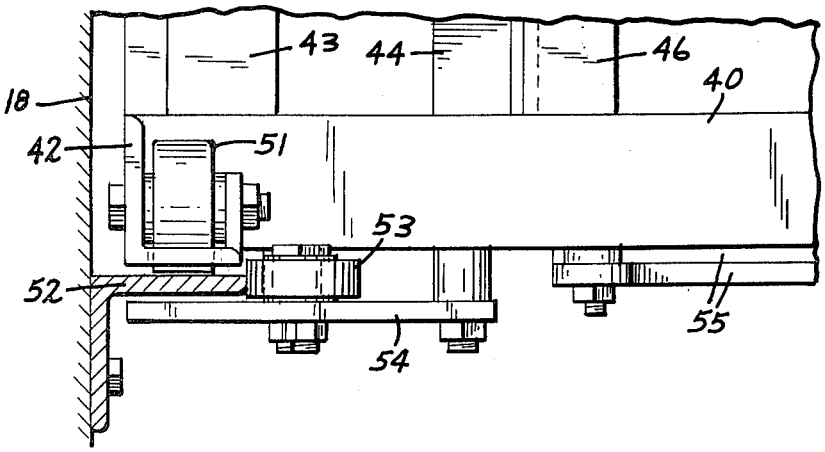
FIG. 8 is an enlarged fragmentary section taken on the line 8—8 of FIG. 6.

Each end frame member 42 is arranged to journal a pair of aligned rolls 51 that have overlying rolling engagement with one of a pair of horizontally disposed rails 52 extending longitudinally of and rigidly secured to the vehicle side walls 18. Retaining rolls 53 are journaled in mounting plates 54 that are bolted or otherwise rigidly secured to the carriage frame members 40 and 41, the retaining rolls 53 engaging inner edges of adjacent ones of the rails 52 to hold the carriage 39 and wall structure thereon against movement transversely of the vehicle box 13. As shown in FIGS. 7 and 8, the mounting plates 54 have portions underlying the rails 52 to limit tilting movement of the carriage and wall structure thereon in directions longitudinally of the vehicle. With reference to FIGS. 2 and 8, it will be seen that rigidity is added to the carriage 39 by angle braces 55 secured at opposite ends to the front and rear frame members 40 and 41.

Normally, and when the vehicle box 13 is loaded with material, the carriage 39 and wall structure carried thereby is disposed adjacent the front wall 20 of the vehicle box. So also is the front end of the platform 22. The platform 22 is provided at its front end with a pair of upwardly projecting legs 56 that are adapted to engage the carriage frame member 40 during initial rearward movement of the platform 22, to move the carriage 39 and parts carried thereby rearwardly of the vehicle box 13. This rearward movement of the platform 22 and carriage 39 is limited by the length of stroke of the plunger rods 35. During such rearward movement, material resting on the floor 17 rearwardly of the platform 22 is pushed rearwardly by the rear wall 26 of the platform 22. Material resting on the top wall 23 of the platform 22 is carried bodily rearwardly thereby as well as being rearwardly moved by the vertical wall section 47 and sloping sloping wall section 49. When the platform 22 reaches its limit of rearward travel, flow of fluid under pressure to the cylinders 33 is reversed, to impart forward movement to the platform 22, while the carriage 39 is held against forward movement by means hereinafter described. The carriage 39 is provided with a pawl 57 comprising an elongated rod 58 journaled at its opposite ends in the front ends of a pair of arms 59 that are journaled in brackets 60 welded or otherwise rigidly secured to the carriage frame member 41. The rod 58 is provided with a plurality of roller acting flanges 61 and is gravity biased toward rolling engagement of the flanges 61 with the top surface of the platform top wall 23. The top wall 23 of the platform 22 is provided with a plurality of pairs of ratchet teeth 62 over which the rod 58 rides after the carriage 39 has been moved rearwardly a predetermined distance from the front wall 20 and during return forward movement of the platform 22. When the platform 22 reaches its limit of forward return movement, the rod 58 is enabled to drop downwardly behind a pair of the ratchet teeth 62. Then, on the next rearward movement of the platform 22, the carriage 39 and wall structure carried thereby is moved rearwardly with the platform 22, so that during reciprocatory movement of the platform 22 longitudinally of the vehicle box 13, the carriage 39 and its wall structure moves rearwardly in a step by step arrangement, as shown by full and dotted lines in FIG. 4. It will be here noted that the side wall elements 48 aid materially in keeping granular or bulk material from exerting undue lateral pressure against the side walls 18 of the vehicle box, thus promoting easy discharge of material through the open rear end of the box.

A pair of generally L-shaped latches 63 are utilized to releasably hold the carriage 39 against forward movement from any of the positions to which it is moved by the platform 22. Each of the latches 63 is pivotally mounted to a different one of the carriage end frame members 42, as indicated at 64, and is movable in an opening 65 in its respective end frame member 42 and into and out of one of a plurality of longitudinally spaced slot-like openings 66 in an underlying one of the rails 52, the openings 66 defining strike portions for the latches 63. The latches 63 are yieldingly urged in a direction to enter the strike forming openings 66 by coil tension springs 67 secured at one of their ends to arm portions 68 of the latches 63 and at their opposite ends to the carriage frame member 40, see particularly FIG. 6. the latches 63 are so shaped that, during rearward movement of the carriage 39, the latches 63 will be cammed out of the openings 66 in the rails 52, against bias of the springs 67. A flexible apron 69 is secured to the lower edge portion of the lower wall section 49, and at least partially closes the gap between the rear edge portion of the carriage 39 and the top wall 23 of the platform 22 when the carriage 39 and wall structure carried thereby is moved rearwardly away from the front wall 20 of the vehicle box 13. The apron 69 prevents the platform 22 from carrying overlying material forwardly under the carriage 39 during forward return movements of the platform 22.

After the vehicle box has been emptied, it is necessary that the carriage 39 be moved to the front end of the vehicle box 13. To accomplish this end, it is first required that the latches 63 be moved out of engagement with the strike openings 66 and that the pawl 57 be moved out of engagement with the ratchet teeth 62. For this purpose, a length of flexible cable 70 has its opposite ends each connected to the arm portion 68 of a different one of the latches 63. The cable 70 passes over a pair of pulleys 71 secured to opposite end portions of the carriage frame member 41, and a similar pair of pulleys 72 connected to the front carriage frame member 40. From the pulleys 72, portions of the cable 70 pass under the pawl rod 58 and rearwardly to openings 73 in the lower edge portion of the lower wall section 49, as shown in FIG. 3. As will be seen, with reference to FIGS. 2, 3, and 7, an intermediate portion 74 of the cable 70 overlies the apron 69. When it is desired that the carriage 39 and wall structure carried thereby be moved to the front end of the vehicle box 13, it is only necessary that the cable portion 74 be pulled generally upwardly and rearwardly to raise the paul 57 out of engagement with the adjacent ratchet teeth 62 and to swing the latches 63 out of engagement with their respective strike openings 66. While holding the cable portion 74 in a pulled out disposition relative to the carriage 39, the operator may easily move the carriage 39 forwardly to the front end of the vehicle box.

While I have shown and described a commercial embodiment of my improved truck unloading device, it will be understood that the same will be capable of modification without departure from the spirit and scope of the invention, as defined in the claims.

I claim:

1. In a vehicle box having laterally spaced side walls, a floor, and front and rear ends, unloading apparatus comprising:
   a. a platform having an upper material supporting surface extending for substantially the full width of the space between said side walls and for the greater part of the length of said box;
   b. roller means mounting the platform for forward and rearward movements on said floor;
   c. means for imparting rearward material discharge movements and forward return movements to said platform;
   d. wall means including a transverse wall structure;

e. means including a carriage and guide means therefor mounting said wall means above said platform for forward and rearward movements in said box;

f. inter-engaging means on said platform and carriage for imparting movements to said wall means in a rearward material discharging direction responsive to said rearward material discharge movement of said platform;

g. and releasable means for holding said wall means against forward movement thereof during forward return movement of the platform.

2. The unloading apparatus according to claim 1 in which said roller means comprises a plurality of floor engaging roller elements on said platform, said platform having a rear wall extending transversely between said side walls for rearwardly discharging material from said floor.

3. The unloading apparatus according to claim 1 in which said guide means includes a pair of horizontal rails on said vehicle side walls, said releasable means comprising a pair of latch members pivotally mounted on said carriage each in overlying relation to a different one of said rails, said rails having longitudinally spaced openings defining strike portions engageable by said latch members, and yielding means urging said latch members toward reception in said openings for latching engagement with said strike portions.

4. The unloading apparatus according to claim 3 in which said inter-engaging means comprises a ratchet on said platform and a cooperating pawl on said carriage yieldingly biased toward engagement with said ratchet.

5. The unloading apparatus according to claim 4, characterized by cable means for simultaneously moving said pawl away from engagement with said ratchet against yielding bias applied thereto and said latch members out of engagement with said strike portions against bias of said yielding means, whereby to permit movement of said wall means in a return direction forwardly of the vehicle box, said cable means including a manually operable portion adjacent the rear surface of said transverse wall structure.

6. The unloading apparatus according to claim 1 in which said platform has an upper load bearing surface which slopes downwardly from the front end of the platform toward the rear end thereof.

* * * * *